United States Patent
Gomyo et al.

(10) Patent No.: US 7,008,109 B2
(45) Date of Patent: Mar. 7, 2006

(54) DYNAMIC PRESSURE BEARING DEVICE

(75) Inventors: Masato Gomyo, Shimosuwa-machi (JP); Noboru Ashibe, Shimosuwa-machi (JP); Masayoshi Saichi, Shimosuwa-machi (JP); Shingo Suginobu, Shimosuwa-machi (JP); Junya Mizukami, Shimosuwa-machi (JP); Nobutaka Nagao, Tokyo (JP); Koichi Shoda, Tokyo (JP); Akihito Kobayashi, Tokyo (JP)

(73) Assignees: Nidec Sankyo Corporation, Kyoto (JP); Toyo Drilube. Co., Ltd., Suwa-Gun (JP)

( * ) Notice: Subject to any disclaimer, the term of this patent is extended or adjusted under 35 U.S.C. 154(b) by 172 days.

(21) Appl. No.: 10/708,105

(22) Filed: Feb. 10, 2004

(65) Prior Publication Data

US 2004/0190802 A1    Sep. 30, 2004

(30) Foreign Application Priority Data

Feb. 10, 2003 (JP) .............................. 2003-032914
Feb. 6, 2004 (JP) .............................. 2004-030009

(51) Int. Cl.
F16C 32/06 (2006.01)
(52) U.S. Cl. ..................................... 384/100; 384/107
(58) Field of Classification Search ................ 384/100, 384/107

See application file for complete search history.

(56) References Cited

U.S. PATENT DOCUMENTS

| 6,409,389 B1 * | 6/2002 | Kadokura et al. .......... 384/100 |
| 6,447,167 B1 * | 9/2002 | Kashiwada et al. ......... 384/107 |
| 6,846,109 B1 * | 1/2005 | Yoshimura et al. ......... 384/279 |
| 2001/0000073 A1 * | 3/2001 | Kobayashi et al. ......... 384/100 |

FOREIGN PATENT DOCUMENTS

JP    2001-289243 A    10/2001

* cited by examiner

Primary Examiner—Thomas R. Hannon
(74) Attorney, Agent, or Firm—Judge Patent Firm

(57) ABSTRACT

A dynamic pressure bearing device includes a dynamic pressure face of a shaft member, a dynamic pressure face of a bearing member, lubricating fluid filled in a bearing space of a dynamic pressure bearing portion including a gap between the dynamic pressure faces, a dynamic pressure generation means for pressing so that the lubricating fluid generates a dynamic pressure that supports the shaft member in a non-contact manner with the bearing member and in a rotatable manner relatively to the bearing member, and a sliding surface layer having abrasion resistance provided to at least one of the dynamic pressure face of the shaft member and the dynamic pressure face of the bearing member. The sliding surface layer is made up of a resin lubricating film in which many particles of solid lubricating material is dispersed, and a maximum diameter of the particles constituting the solid lubricating material included in the sliding surface layer is smaller than a minimum gap size of the bearing space of the dynamic pressure bearing portion.

4 Claims, 8 Drawing Sheets

| | Integrated Value Q(%) | Particle Diameter x(μm) | | Integrated Value Q(%) | Particle Diameter x(μm) | | Integrated Value Q(%) | Particle Diameter x(μm) |
|---|---|---|---|---|---|---|---|---|
| 1 | 98.000 | 2.667 | 18 | 64.000 | 1.200 | 35 | 30.000 | 0.922 |
| 2 | 96.000 | 2.300 | 19 | 62.000 | 1.180 | 36 | 28.000 | 0.909 |
| 3 | 94.000 | 2.050 | 20 | 60.000 | 1.161 | 37 | 26.000 | 0.896 |
| 4 | 92.000 | 1.910 | 21 | 58.000 | 1.143 | 38 | 24.000 | 0.884 |
| 5 | 90.000 | 1.803 | 22 | 56.000 | 1.124 | 39 | 22.000 | 0.871 |
| 6 | 88.000 | 1.702 | 23 | 54.000 | 1.106 | 40 | 20.000 | 0.859 |
| 7 | 86.000 | 1.608 | 24 | 52.000 | 1.088 | 41 | 18.000 | 0.847 |
| 8 | 84.000 | 1.550 | 25 | 50.000 | 1.071 | 42 | 16.000 | 0.835 |
| 9 | 82.000 | 1.505 | 26 | 48.000 | 1.054 | 43 | 14.000 | 0.823 |
| 10 | 80.000 | 1.461 | 27 | 46.000 | 1.037 | 44 | 12.000 | 0.812 |
| 11 | 78.000 | 1.418 | 28 | 44.000 | 1.020 | 45 | 10.000 | 0.801 |
| 12 | 76.000 | 1.377 | 29 | 42.000 | 1.004 | 46 | 8.000 | 0.776 |
| 13 | 74.000 | 1.337 | 30 | 40.000 | 0.989 | 47 | 6.000 | 0.737 |
| 14 | 72.000 | 1.297 | 31 | 38.000 | 0.975 | 48 | 4.000 | 0.700 |
| 15 | 70.000 | 1.260 | 32 | 36.000 | 0.962 | 49 | 2.000 | 0.665 |
| 16 | 68.000 | 1.239 | 33 | 34.000 | 0.948 | | | |
| 17 | 66.000 | 1.219 | 34 | 32.000 | 0.935 | | | |

Fig. 3

| | Integrated Value Q(%) | Particle Diameter x(μm) | | Integrated Value Q(%) | Particle Diameter x(μm) | | Integrated Value Q(%) | Particle Diameter x(μm) |
|---|---|---|---|---|---|---|---|---|
| 1 | 98.000 | 5.980 | 18 | 64.000 | 2.774 | 35 | 30.000 | 1.794 |
| 2 | 96.000 | 5.147 | 19 | 62.000 | 2.704 | 36 | 28.000 | 1.744 |
| 3 | 94.000 | 4.768 | 20 | 60.000 | 2.637 | 37 | 26.000 | 1.694 |
| 4 | 92.000 | 4.488 | 21 | 58.000 | 2.570 | 38 | 24.000 | 1.647 |
| 5 | 90.000 | 4.224 | 22 | 56.000 | 2.506 | 39 | 22.000 | 1.600 |
| 6 | 88.000 | 3.978 | 23 | 54.000 | 2.445 | 40 | 20.000 | 1.549 |
| 7 | 86.000 | 3.846 | 24 | 52.000 | 2.386 | 41 | 18.000 | 1.496 |
| 8 | 84.000 | 3.719 | 25 | 50.000 | 2.328 | 42 | 16.000 | 1.445 |
| 9 | 82.000 | 3.597 | 26 | 48.000 | 2.272 | 43 | 14.000 | 1.396 |
| 10 | 80.000 | 3.478 | 27 | 46.000 | 2.216 | 44 | 12.000 | 1.348 |
| 11 | 78.000 | 3.363 | 28 | 44.000 | 2.163 | 45 | 10.000 | 1.302 |
| 12 | 76.000 | 3.252 | 29 | 42.000 | 2.110 | 46 | 8.000 | 1.258 |
| 13 | 74.000 | 3.149 | 30 | 40.000 | 2.059 | 47 | 6.000 | 1.188 |
| 14 | 72.000 | 3.070 | 31 | 38.000 | 2.009 | 48 | 4.000 | 1.121 |
| 15 | 70.000 | 2.993 | 32 | 36.000 | 1.955 | 49 | 2.000 | 1.059 |
| 16 | 68.000 | 2.918 | 33 | 34.000 | 1.900 | | | |
| 17 | 66.000 | 2.845 | 34 | 32.000 | 1.846 | | | |

Fig. 5

|   | Integrated Value Q(%) | Particle Diameter x(μm) |   | Integrated Value Q(%) | Particle Diameter x(μm) |   | Integrated Value Q(%) | Particle Diameter x(μm) |
|---|---|---|---|---|---|---|---|---|
| 1 | 98.000 | 13.859 | 18 | 64.000 | 5.543 | 35 | 30.000 | 3.448 |
| 2 | 96.000 | 11.877 | 19 | 62.000 | 5.377 | 36 | 28.000 | 3.355 |
| 3 | 94.000 | 10.695 | 20 | 60.000 | 5.215 | 37 | 26.000 | 3.265 |
| 4 | 92.000 | 9.798 | 21 | 58.000 | 5.059 | 38 | 24.000 | 3.176 |
| 5 | 90.000 | 9.257 | 22 | 56.000 | 4.918 | 39 | 22.000 | 3.082 |
| 6 | 88.000 | 8.746 | 23 | 54.000 | 4.785 | 40 | 20.000 | 2.998 |
| 7 | 86.000 | 7.263 | 24 | 52.000 | 4.657 | 41 | 18.000 | 2.897 |
| 8 | 84.000 | 7.852 | 25 | 50.000 | 4.531 | 42 | 16.000 | 2.809 |
| 9 | 82.000 | 7.559 | 26 | 48.000 | 4.409 | 43 | 14.000 | 2.724 |
| 10 | 80.000 | 7.277 | 27 | 46.000 | 4.291 | 44 | 12.000 | 2.641 |
| 11 | 78.000 | 7.006 | 28 | 44.000 | 4.175 | 45 | 10.000 | 2.561 |
| 12 | 76.000 | 6.745 | 29 | 42.000 | 4.063 | 46 | 8.000 | 2.463 |
| 13 | 74.000 | 6.493 | 30 | 40.000 | 3.954 | 47 | 6.000 | 2.337 |
| 14 | 72.000 | 6.263 | 31 | 38.000 | 3.847 | 48 | 4.000 | 2.217 |
| 15 | 70.000 | 6.075 | 32 | 36.000 | 3.743 | 49 | 2.000 | 2.103 |
| 16 | 68.000 | 5.982 | 33 | 34.000 | 3.642 |   |   |   |
| 17 | 66.000 | 5.715 | 34 | 32.000 | 3.544 |   |   |   |

Fig. 7

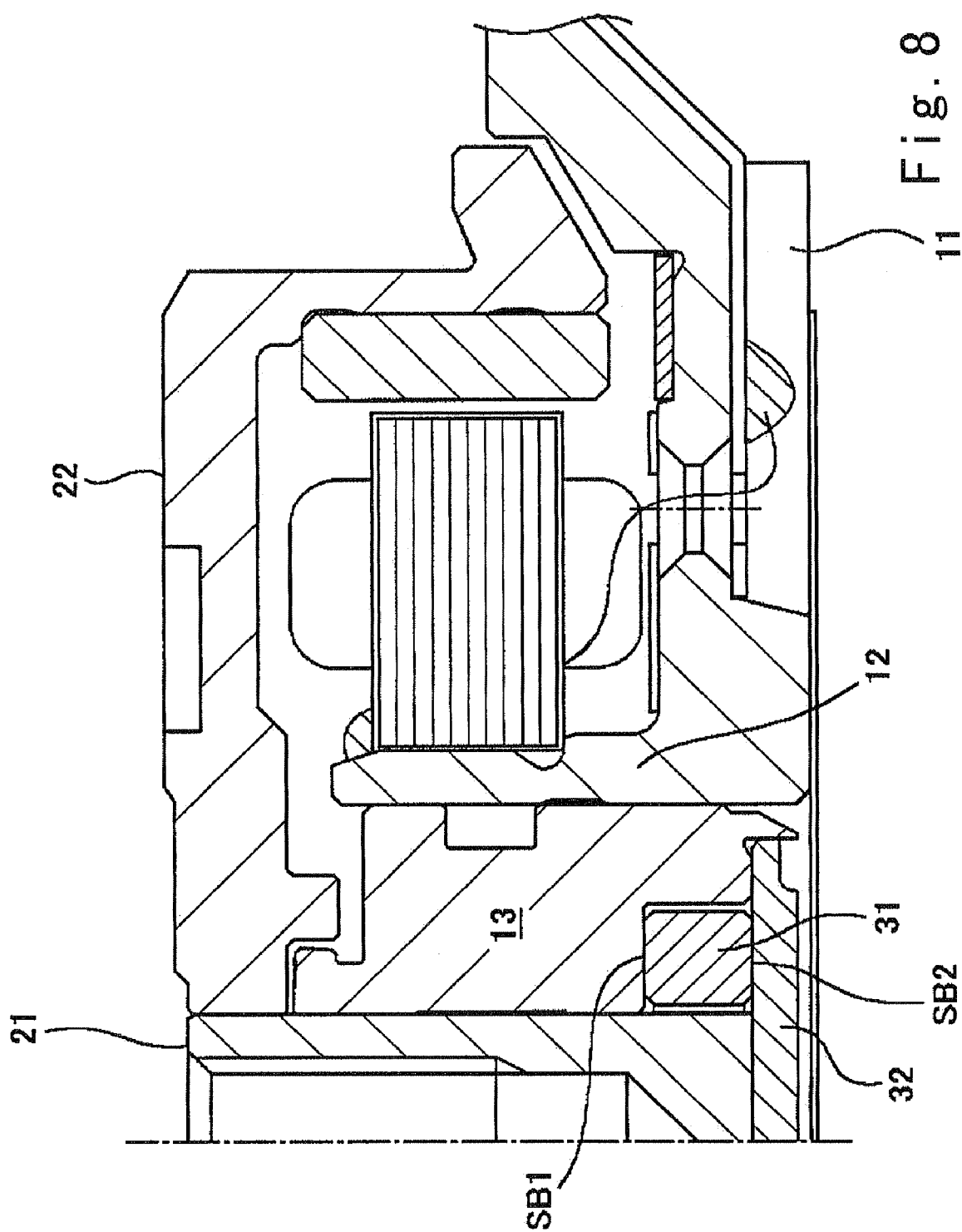

DYNAMIC PRESSURE BEARING DEVICE

BACKGROUND OF INVENTION

1. Field of the Invention

The present invention relates to a dynamic pressure bearing device that utilizes a dynamic pressure of a lubricating fluid for supporting a shaft member by a bearing member.

2. Description of the Prior Art

In recent years, the development of a dynamic pressure bearing device has been pursued, which is a type of bearing for enabling a rotating member to rotate at high speed with high accuracy in various rotation driving devices. The dynamic pressure bearing uses a dynamic pressure of a lubricating fluid for supporting a rotating shaft. The dynamic pressure bearing device includes a dynamic pressure face of a shaft member and a dynamic pressure face of a bearing member, which are arranged to face each other and to be close in the radial direction or in the axial direction. Between the opposed dynamic pressure faces, a bearing space of a radial dynamic pressure bearing portion or a thrust dynamic pressure bearing portion is formed. An appropriate lubricating fluid is filled in the bearing space, and appropriate dynamic pressure generation means including a herringbone shaped groove generate a dynamic pressure in the lubricating fluid. The generated dynamic pressure is used for non-contact bearing of the shaft member by the bearing member in relatively rotatable manner.

In this dynamic pressure bearing device, the shaft member contacts with the bearing member temporarily at start or stop of rotation. Accordingly, a measure for improving abrasion resistance is provided to the dynamic pressure face of each member. For example, one of or both the dynamic pressure faces of the shaft member and the bearing member are provided with a sliding surface layer having abrasion resistance as described in Japanese unexamined patent publication No. 2001-289243. Such a sliding surface layer is made of a composite material including a thin metal plate as a substrate on which material containing zinc or tin is coated, a composite material coated with a solid lubricating material containing fluorocarbon resin, graphite or molybdenum disulfide, a ceramic such as alumina, or a copper type material such as aluminum bronze or manganese bronze. Furthermore, the above-mentioned thin metal plate is made of copper or a copper type material.

However, in this structure of the dynamic pressure bearing device including a sliding surface layer that has abrasion resistance to the dynamic pressure face of the shaft member or the bearing member, there is a case where the sliding surface layer comes off gradually from the surface after long period of usage. In this case, particles from the sliding surface layer will be suspended in the bearing space of the dynamic pressure bearing portion. If the suspended particles are caught between the shaft member and the bearing member, the dynamic pressure face may be damaged so that the dynamic pressure is lowered and a rotation locked state may happen.

SUMMARY OF INVENTION

An object of the present invention is to provide a dynamic pressure bearing device that can support a shaft member by a bearing member over a long period even if there are some exfoliation of the sliding surface layer.

According to one aspect of the present invention, a dynamic pressure bearing device is provided that includes a dynamic pressure face of a shaft member, a dynamic pressure face of a bearing member, lubricating fluid filled in a bearing space of a dynamic pressure bearing portion including a gap between the dynamic pressure faces, a dynamic pressure generation means for pressing so that the lubricating fluid generates a dynamic pressure that supports the shaft member in a non-contact manner with the bearing member and in a rotatable manner relatively to the bearing member, and a sliding surface layer having abrasion resistance provided to at least one of the dynamic pressure face of the shaft member and the dynamic pressure face of the bearing member. The sliding surface layer is made up of a resin lubricating film in which many particles of solid lubricating material is dispersed, and a maximum diameter of the particles constituting the solid lubricating material included in the sliding surface layer is smaller than a minimum gap size of the bearing space of the dynamic pressure bearing portion.

According to this structure, even if a part of the sliding surface layer is peeled off in the dynamic pressure bearing space, the particles of the peeled sliding surface layer are not caught in the gap of the bearing space since the diameters of the particles are smaller than the minimum gap size of the bearing space. Here, the "minimum gap size of the bearing space" means a minimum gap size between the shaft member and the bearing member upon rotation. More specifically, it is defined as a minimum size of the gap in the radial direction between the shaft member and the bearing member when the axial center of the shaft member becomes identical to the axial center of the bearing member.

In a preferred embodiment of a second aspect of the present invention, the solid lubricating material has cleavage property.

According to this structure, particles of the solid lubricating material that are peeled from the sliding surface layer float in the lubricating fluid as thin scales. When a pressure is applied to the lubricating fluid, the thin scales of particles of the sliding surface layer are arranged so that the thickness direction of the thin scale corresponds to the radial direction. As a result, the particles of the sliding surface layer are not caught securely between the shaft member and the bearing member. Thus, the smooth floating state of the particles is maintained so that the safety of the device is enhanced.

In a preferred embodiment of a third aspect of the present invention, the dynamic pressure bearing portion is made up of at least one of the radial dynamic pressure bearing portion and the thrust dynamic pressure bearing portion. Thus, the present invention can be applied to both the radial and the thrust dynamic pressure bearing portions in the same way.

In a preferred embodiment of a fourth aspect of the present invention, the radial dynamic pressure bearing portion and the thrust dynamic pressure bearing portion are formed so as to have a bearing space that is continuous to each other.

According to this structure, the lubricating fluid can be injected into the radial dynamic pressure bearing portion and the thrust dynamic pressure bearing portion at one time, so that the assembly process can be simplified. On the other hand, particles that are peeled from the sliding surface layer of the thrust dynamic pressure bearing portion having relatively large gap size of the bearing space upon rotation can go into the bearing space of the radial dynamic pressure bearing portion having small gap size. However, since the particles of the sliding surface layer have diameters smaller than the gap size of the bearing space, the particles of the sliding surface layer are not caught in the gap.

BRIEF DESCRIPTION OF DRAWINGS

FIG. 3 is a chart showing a table of the distribution of particle diameter of the solid lubricating material shown in FIG. 2.

FIG. 5 is a chart showing a table of the distribution of particle diameter of the solid lubricating material shown in FIG. 4.

FIG. 7 is a chart showing a table of the distribution of particle diameter of the solid lubricating material shown in FIG. 6.

FIG. 8 is a cross section of a shaft rotation type spindle motor for an HDD having a dynamic pressure bearing device according to another embodiment of the present invention.

DETAILED DESCRIPTION

Description of the Preferred Embodiments

Hereinafter, an embodiment of the present invention will be explained in detail with reference to attached drawings. Before the explanation, a general explanation of a spindle motor for a hard disk driving (HDD) will be described as an example that adopts the dynamic pressure bearing device according to the present invention first. The spindle motor in this embodiment is for a 2.5 inch type HDD.

Figure 1:
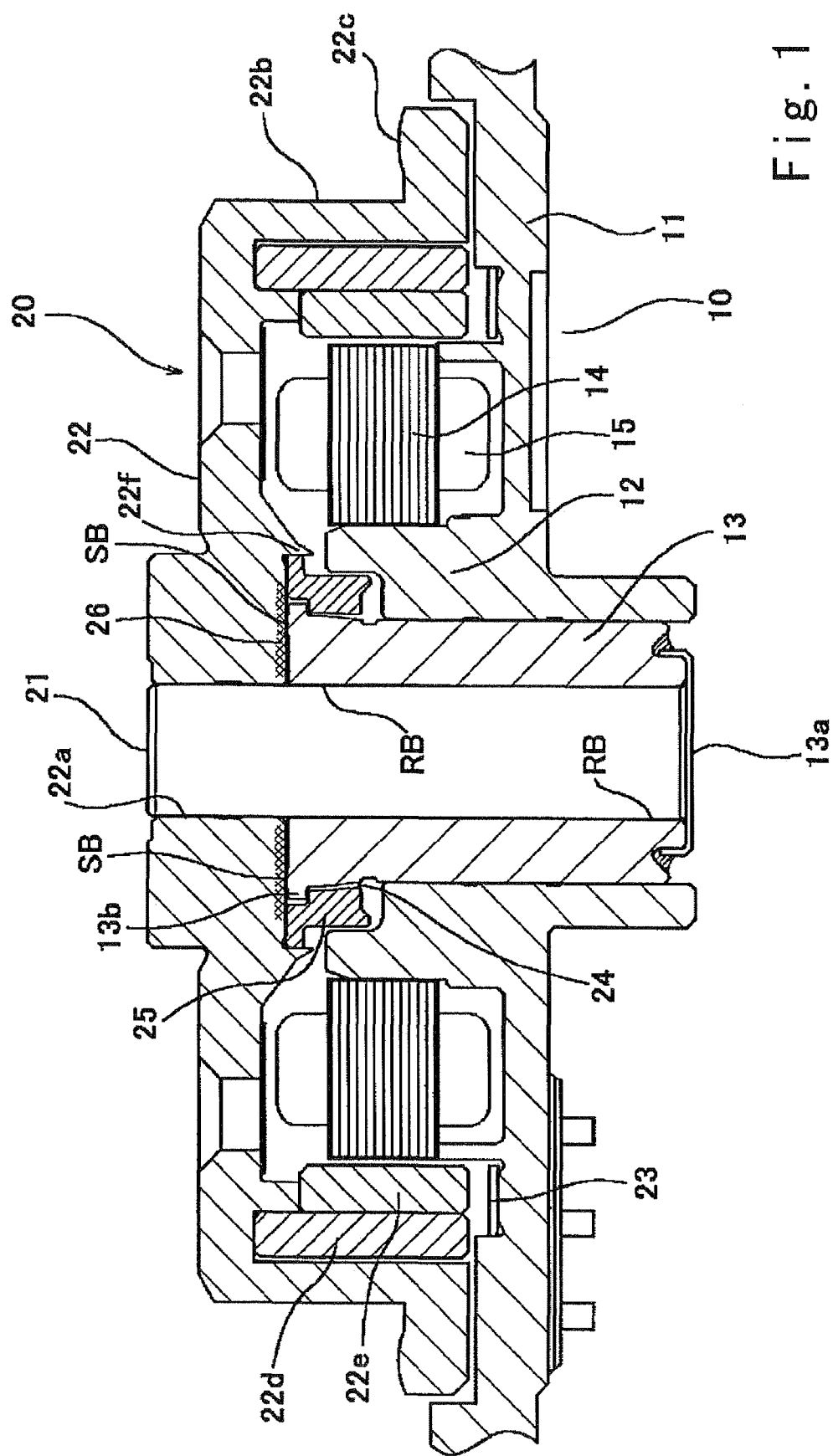
FIG. 1 is a cross section of a shaft rotation type spindle motor for an HDD having a dynamic pressure bearing device according to an embodiment of the present invention.

The general structure of a shaft rotation type spindle motor for an HDD shown in FIG. 1 includes a stator unit 10 as a fixed member and a rotor unit 20 as a rotation member that is attached to the stator unit 10 from the upper side in FIG. 1. The stator unit 10 has a fixed frame 11 that is fastened to a fixed pedestal (not shown) with screws. This fixed frame 11 is made of an aluminum type metal material for reducing weight. An annular bearing holder 12 is formed to stand at a substantially center portion of the fixed frame 11, and a bearing sleeve 13 having a hollow cylindrical shape as a dynamic pressure bearing member is fit in the bearing holder 12 by a press fit process or a shrink fit process. This bearing sleeve 13 is made of a copper type material such as phosphor bronze so as to make it easy to form tiny holes.

In addition, a stator core 14 that is a laminated electromagnetic steel is attached to the peripheral attachment surface of the bearing holder 12, and drive windings 15 are wound around salient poles of the stator core 14.

In addition, a rotating shaft 21 that constitutes the rotor unit 20 is inserted in the center hole of the bearing sleeve 13 as the dynamic pressure bearing member in a rotatable manner. Namely, the dynamic pressure face of the inner surface of the bearing sleeve 13 is opposed to the dynamic pressure face of the outer surface of the rotating shaft 21 closely in the radial direction. Two radial dynamic pressure bearing portions RB and RB are formed in a bearing space including a micro-gap between the two dynamic pressure faces with an appropriate distance in the axial direction. More specifically, the dynamic pressure face of the bearing sleeve 13 and the dynamic pressure face of the rotating shaft 21 in the radial dynamic pressure bearing portion RB are arranged to face each other in a circumferential manner via a micro-gap of several microns. Lubricating fluid such as lubricating oil or magnetic fluid is injected into the bearing space including the micro-gap to as to be continuous in the axial direction.

In addition, one of or both the dynamic pressure faces of the bearing sleeve 13 and the rotating shaft 21 is provided with a radial dynamic pressure generating groove having a herringbone shape for example, which is formed annularly divided into two blocks. Upon rotation, the radial dynamic pressure generating groove provides pumping action and presses the lubricating fluid (not shown) so as to generate a dynamic pressure. This dynamic pressure of the lubricating fluid supports the rotating shaft 21 and the rotation hub 22 that will be explained later toward the bearing sleeve 13 in the radial direction in a non-contact state.

On the other hand, the rotation hub 22 constituting the rotor unit 20 with the rotating shaft 21 is made up of a substantially cup-like member made of a ferrite type stainless steel. The upper portion of the illustrated rotating shaft 21 is fit in a joint hole provided to the center portion of the rotation hub 22 by a press fit process or a shrink fit process. This rotation hub 22 has a substantially cylindrical trunk portion 22*b* that retains a recording medium disk such as a magnetic disk (not shown) on the peripheral portion, and a disk stage portion 22*c* that extends from the trunk portion 22*b* outward in the radial direction so as to support the recording medium disk in the axial direction. The recording medium disk is fixed by a damper (not shown) that is placed and screwed from the upper side in FIG. 1 so as to press the recording medium disk downward.

In addition, an annular drive magnet 22*e* is attached to the inner wall face of the trunk portion 22*b* of the rotation hub 22 via an annular yoke 22*d* made of a magnetic material. The inner circular face of the annular drive magnet 22*e* is placed so as to face and close to outer end surfaces of the salient pole portions of the stator core 14. The lower end face of the annular drive magnet 22*e* in the axial direction is disposed at the position opposed to a magnetic attraction plate 23 that is attached to the fixed frame 11 in the axial direction. The magnetic attraction force between the members 22*e* and 23 makes the entire of the above-mentioned rotation hub 22 is attracted magnetically so that a stable rotation state can be obtained. Furthermore, this embodiment is designed so that a total sum of the weight of the rotor unit 20 and the above-mentioned magnetic attraction force is 100 grams or less.

In addition, an opening portion that is provided to the lower end of the bearing sleeve 13 in FIG. 1 is closed by a cover 13*a*, so that lubricating fluid in the above-mentioned radial dynamic pressure bearing portions RB does not leak externally.

Moreover, the upper end face of the bearing sleeve 13 and the lower end face of the center portion of the rotation hub 22 in FIG. 1 are disposed to face each other and close to each other in the axial direction. A thrust dynamic pressure bearing portion SB that is continuous from the radial bearing portion RB is provided to the bearing space between the upper end face of the bearing sleeve 13 and the lower end face of the rotation hub 22. Namely, a thrust dynamic pressure generating groove having a spiral shape or a herringbone shape is formed at one of or both the upper end face of the bearing sleeve 13 and the lower end face of the rotation hub 22. The opposed portion thereof in the axial direction including the thrust dynamic pressure generating groove is the thrust dynamic pressure bearing portion SB.

The dynamic pressure face of the upper end face of the bearing sleeve 13 and the dynamic pressure face of the lower end face of the rotation hub 22, which are opposed and close to each other and constitute the thrust dynamic pressure bearing portion SB, are disposed to face each other via a several microns in the axial direction upon rotation. Lubricating fluid such as oil or magnetic fluid is supplied from the radial dynamic pressure bearing portion RB so as to fill continuously in the bearing space of the micro-gap upon rotation. By a pumping action of the above-mentioned thrust dynamic pressure generating groove, the lubricating fluid is pressed so as to generate a dynamic pressure. The rotating shaft 21 and the rotation hub 22 are supported by the dynamic pressure of the lubricating fluid in a non-contact state floating in the thrust direction.

The thrust dynamic pressure bearing portion SB in this embodiment is disposed at a position corresponding to the outermost side in the bearing space including the gap between the upper end face of the bearing sleeve 13 and the lower end face of the rotation hub 22 so as to work also as pumping means for pressing the lubricating fluid inward in the radial direction that exists in the entire portion of the bearing space including the thrust dynamic pressure bearing portion SB in the outermost portion of the bearing space.

In addition, a fluid seal portion that is made up of a capillary tube seal portion 24 is defined by the outermost wall face of the bearing sleeve 13 as the dynamic pressure bearing member. Namely, the capillary tube seal portion 24 as the fluid seal portion is continuous from the outer side of the bearing space in the radial direction including the thrust dynamic pressure bearing portion SB. The outer wall face of the bearing sleeve 13 and the inner wall face of the ring 25 as a drop stopper member that is formed to face the outer wall face of the bearing sleeve 13 in the radial direction define the capillary tube seal portion 24. The ring 25 is made up of a ring-like member that is fixed to a flange portion 22*f* that is provided to the rotation hub 22. A gap between the inner wall face of the ring 25 and the outer wall face of the bearing sleeve 13 is continuously increased toward the opening portion in the lower side in FIG. 1, so that a taper-shaped seal space is defined. Then, the lubricating fluid in the thrust dynamic pressure bearing portion SB is filled continuously to the capillary tube seal portion 24.

In addition, the upper portion of the bearing sleeve 13 in FIG. 1 extends outward in the radial direction so as to form a drop stopper collar portion 13*b*. A part of the collar portion 13*b* is opposed to a part of the ring 25 in the axial direction. The rotation hub 22 is prevented from dropping off in the axial direction by the members 13*b* and 25.

A sliding surface layer 26 having abrasion resistance is formed as a film by a coating process or other process on a plane including the dynamic pressure face of the lower end face of the rotation hub 22 that constitutes the thrust dynamic pressure bearing portion SB (see portions with cross hatching in FIG. 1). This sliding surface layer 26 is made up of a resin lubricating film in which a solid lubricating material made of many particles is dispersed. As the solid lubricating material in this embodiment, a material having cleavage property such as graphite or molybdenum disulfide, i.e., a material having a characteristic that the surface layer can be peeled as a thin film is adopted.

A maximum diameter of particles of the solid lubricating material included in the sliding surface layer 26 is set to a value smaller than the minimum gap size of the bearing space in the radial dynamic pressure bearing portion RB. In an example shown in FIGS. 2 and 3, the gap in the radial dynamic pressure bearing portion RB is approximately 3 microns for one side, and the solid lubricating material made of a molybdenum disulfide particles is used. An average diameter of particles is 1.132 microns, and 98% of particles have diameter up to 2.667 microns.

Here, the minimum gap size of the bearing space means a minimum size of the gap in the radial direction between the rotating shaft 21 and the bearing sleeve 13 in the radial dynamic pressure bearing portion RB under the condition where the axial center of the rotating shaft 21 is identical to that of the bearing sleeve 13. Furthermore, when viewing the cross section in the axial direction as shown in FIG. 1, gaps are generated at both sides in the radial direction of the rotating shaft 21 between the rotating shaft 21 and the bearing sleeve 13. However, the gap in the radial direction here means one of the gaps at both sides but does not mean the total sum of the both gaps.

Here, a case may happen where only a part of the sliding surface layer 26 that is provided to the thrust dynamic pressure bearing portion SB is peeled off and floats in the bearing space of the thrust dynamic pressure bearing portion SB. This case scarcely becomes a problem since the gap in the thrust dynamic pressure bearing portion SB is large upon rotation. However, if the peeled particles of sliding surface layer 26 moves from the thrust dynamic pressure bearing portion SB having a large gap size into the bearing space of the radial dynamic pressure bearing portion RB having a small gap size, a phenomenon that the particles are caught in a small gap can happen in the same way as the conventional structure. However, according to this embodiment having the above-mentioned structure, the peeled particles of the sliding surface layer 26 are not caught in the gap of the bearing space since their diameters are smaller than the minimum gap size of the bearing space in the radial dynamic pressure bearing portion RB. As a result, smooth rotation state is maintained so that a life of the bearing is lengthened substantially.

Particularly, since the solid lubricating material that constitutes the sliding surface layer 26 in the dynamic pressure bearing device according to this embodiment has cleavage property, particles of the solid lubricating material that are peeled from the sliding surface layer 26 float in the lubricating fluid as thin scales. When a pressure is applied to the lubricating fluid including the thin scales of particles of the sliding surface layer, the thin scales of the particles are arranged so that the thickness direction of the thin scale corresponds to the radial direction. As a result, the particles of the sliding surface layer are not caught securely between the rotating shaft 21 and the bearing sleeve 13. Thus, the smooth floating state of the particles is maintained so that the safety of the device is enhanced.

Furthermore, considering the abrasion resistance of the thrust dynamic pressure bearing portion SB, it is desirable that diameters of the particles of the solid lubricating material included in the sliding surface layer 26 are large. However, in the case of this embodiment, the spindle motor has a light weight of the rotation member as the total sum of the weight of the rotor unit 20 and the magnetic attraction force between the annular drive magnet 22*e* and the magnetic attraction plate 23 is 100 grams or less. In this case, abrasion progress of thrust dynamic pressure bearing portion SB is substantially slow compared with a spindle motor having a heavy rotation member. Therefore, when setting the maximum diameter of particles of the solid lubricating material included in the sliding surface layer 26 is smaller than the minimum gap size of the bearing space in the radial dynamic pressure bearing portion RB, the problem of the abrasion resistance is not generated so that the above-mentioned effect can be obtained for a spindle motor having a light rotation member.

Figure 4:
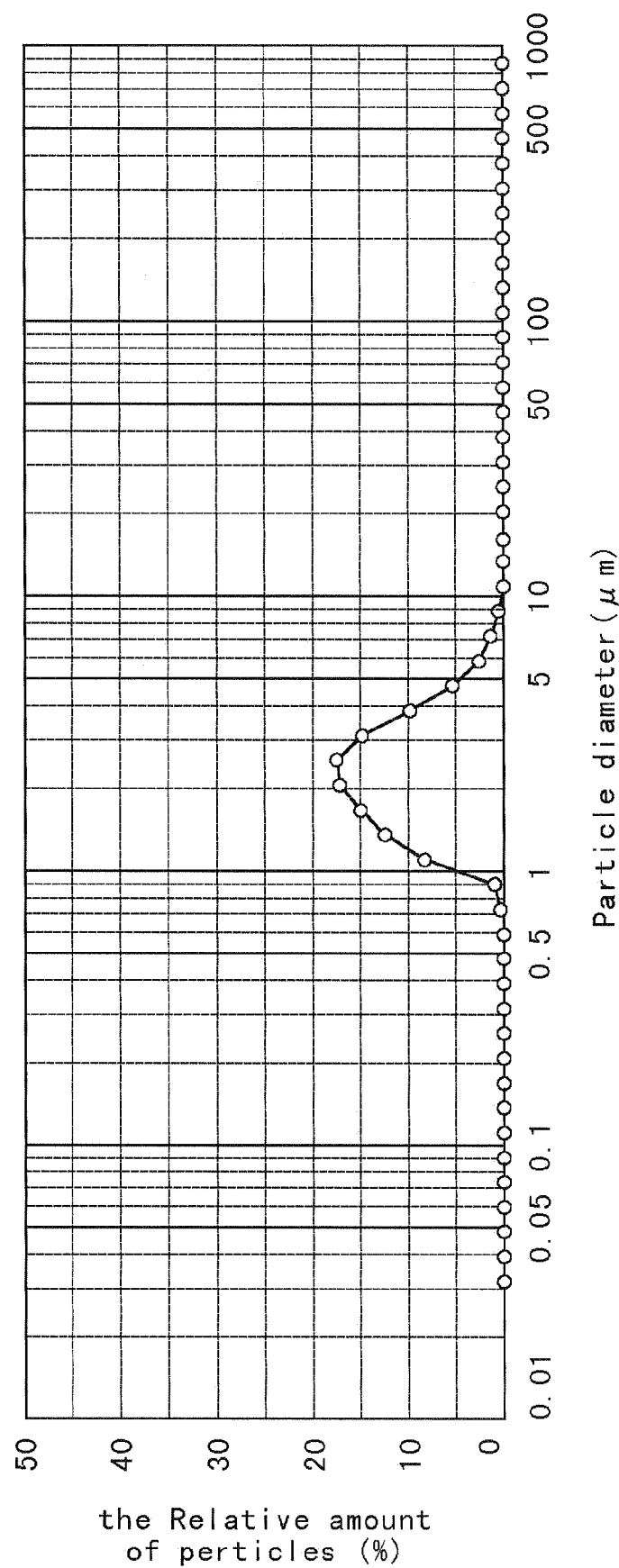
FIG. 4 is a graph showing a distribution of particle diameter of a solid lubricating material that constitutes a sliding surface layer in a reference example.
Figure 6:
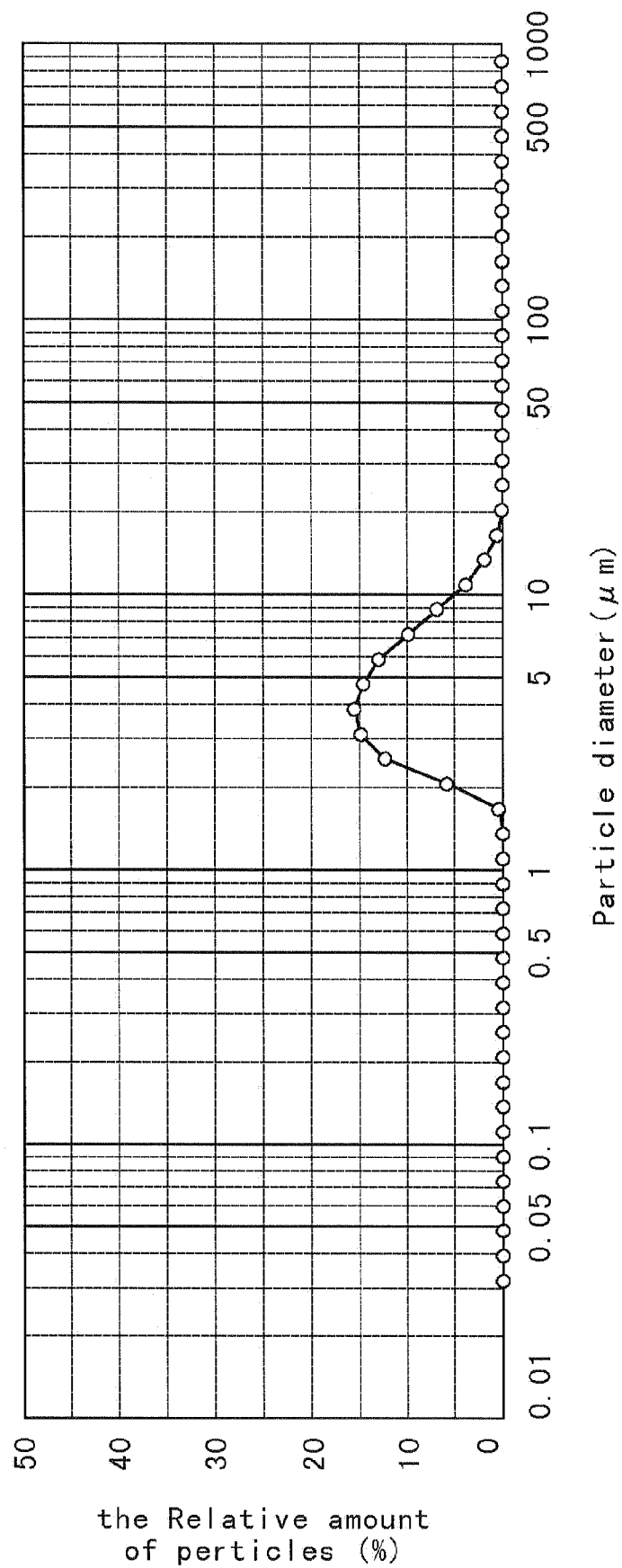
FIG. 6 is a graph showing a distribution of particle diameter of a solid lubricating material that constitutes a sliding surface layer in another reference example.

On the contrary, in the reference example shown in FIGS. 4 and 5, a solid lubricating material made of molybdenum disulfide particles whose average diameter is 2.348 microns is used. However, only 70% of all particles have diameters less than 2.990 microns. In the reference example shown in FIGS. 6 and 7, the solid lubricating material is made of graphite particles having average diameter of 4.716 microns, and only 20% of all particles have diameters less than 2.988 microns. It was confirmed that a desired bearing life cannot be obtained in these reference examples unlike the above-mentioned example.

Figure 2:
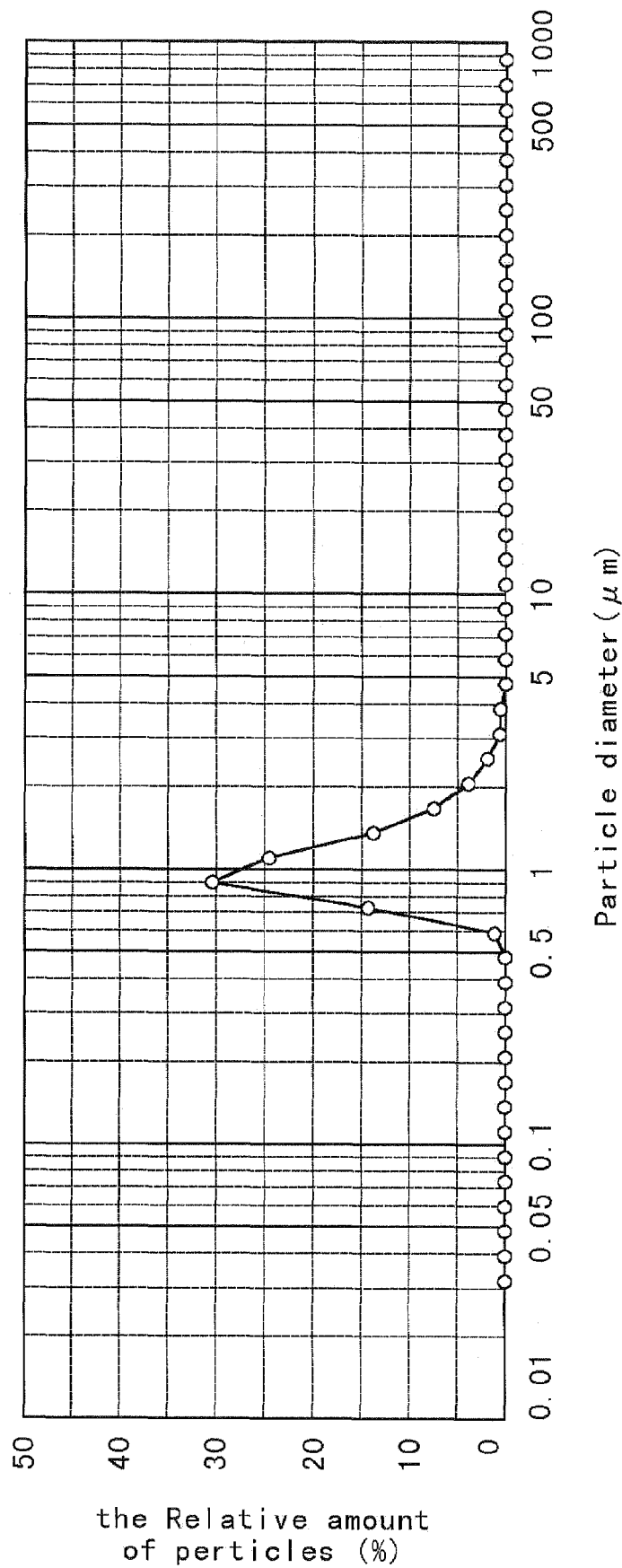
FIG. 2 is a graph showing a distribution of particle diameter of a solid lubricating material that constitutes a sliding surface layer in the dynamic pressure bearing device used in the HDD spindle motor FIG. 1.

Namely, a life test was performed using a HDD spindle motor that adopts the thrust dynamic pressure bearing portion SB including the sliding surface layer 26 made of the solid lubricating material according to the example shown in FIGS. 2 and 3. As a result of the test, stop of the HDD spindle motor did not occur due to particles of the solid lubricating material peeled from the sliding surface layer 26. In contrast, when adopting the thrust dynamic pressure bearing portion including the sliding surface layer 26 made of the solid lubricating material of the reference example shown in FIGS. 4 and 5, the HDD spindle motor stopped after 67.5 hours rotation due to the peeled particles of the solid lubricating material. In addition, when adopting the thrust dynamic pressure bearing portion including the sliding surface layer 26 made of the solid lubricating material of the reference example shown in FIGS. 6 and 7, the HDD spindle motor stopped after 67 hours rotation due to the peeled particles of the solid lubricating material.

Next, another embodiment will be explained with reference to FIG. 8, in which the same reference numerals are used for denoting the elements corresponding to the above-mentioned embodiment. In this embodiment shown in FIG. 8, a disk-like thrust plate 31 that also works as a drop stopper member is attached to the lower end portion of the rotating shaft 21. A thrust dynamic pressure bearing portion SB1 is formed on the upper surface of the thrust plate 31, while a thrust dynamic pressure bearing portion SB2 is formed on the lower surface of the thrust plate 31. Namely, the thrust dynamic pressure bearing portion SB1 is formed in the bearing space between the upper surface of the thrust plate 31 and the opposing surface of the bearing sleeve 13 that is opposed and close to the upper surface of the thrust plate 31. In addition, a counter plate 32 is arranged to be opposed and close to the lower surface of the thrust plate 31 in the axial direction and is fixed so as to close the opening portion of the bearing sleeve 13 at the lower end portion. The thrust dynamic pressure bearing portion SB2 is formed in the bearing space including a gap between the thrust plate 31 and the counter plate 32.

In this embodiment too, the same effect the above-mentioned embodiment can be obtained by providing a sliding surface layer to each of the dynamic pressure faces of the thrust dynamic pressure bearing portions SB1 and SB2 in the same way as the above-mentioned embodiment.

Although the present invention is explained on the basis of the above embodiments in detail, the present invention is not limited to the embodiments. The structures of the embodiments can be modified in the scope of the present invention.

For example, although the sliding surface layer 26 is provided to the rotation hub 22 in the above-explained embodiment, it may be provided to the dynamic pressure face side of the upper end face of the bearing sleeve 13. Alternatively, it may be provided to each of the members.

The present invention is applied to a dynamic pressure bearing device having a bearing space in which the thrust dynamic pressure bearing portion and the radial dynamic pressure bearing portion are continuous in the above-explained embodiment. However, the present invention can also be applied to a dynamic pressure bearing device in which the thrust dynamic pressure bearing portion and the radial dynamic pressure bearing portion are provided independently of each other.

In addition, although a resin lubricating film in which a solid lubricating material is dispersed is formed at the thrust dynamic pressure bearing portion SB in the above-explained embodiment, it is possible to form a solid lubricating film at the radial dynamic pressure bearing portion.

Moreover, the present invention can be applied to a dynamic pressure bearing device that utilizes air as the lubricating fluid without limited to a dynamic pressure bearing device that utilizes oil or magnetic fluid as the lubricating fluid as the above-explained embodiments.

In addition, although the present invention is applied to an HDD spindle motor in the above-explained embodiments, the present invention can also be applied to other various dynamic pressure bearing devices.

What is claimed is:

1. A dynamic pressure bearing device comprising:
   a dynamic pressure face of a shaft member;
   a dynamic pressure face of a bearing member;
   lubricating fluid filled in a bearing space of a dynamic pressure bearing portion including a gap between the dynamic pressure faces;
   a dynamic pressure generation means for pressing so that the lubricating fluid generates a dynamic pressure that supports the shaft member in a noncontact manner with the bearing member and in a rotatable manner relatively to the bearing member; and
   a sliding surface layer having abrasion resistance provided to at least one of the dynamic pressure face of the shaft member and the dynamic pressure face of the bearing member; wherein
   the sliding surface layer is made up of a resin lubricating film in which many particles of solid lubricating material is dispersed, and
   a maximum diameter of the particles constituting the solid lubricating material included in the sliding surface layer is smaller than a minimum gap size of the bearing space of the dynamic pressure bearing portion.

2. The dynamic pressure bearing device according to claim 1, wherein the solid lubricating material has cleavage property.

3. The dynamic pressure bearing device according to claim 1, wherein the dynamic pressure bearing portion is made up of at least one of the radial dynamic pressure bearing portion and the thrust dynamic pressure bearing portion.

4. The dynamic pressure bearing device according to claim 3, wherein the radial dynamic pressure bearing portion and the thrust dynamic pressure bearing portion are formed so as to have a bearing space that is continuous to each other.

* * * * *